(12) United States Patent
Le Costaouec

(10) Patent No.: US 10,717,259 B2
(45) Date of Patent: Jul. 21, 2020

(54) METHOD TO TRANSPORT AND LAY DOWN DRY FIBER BUNDLES

(71) Applicant: Goodrich Corporation, Charlotte, NC (US)

(72) Inventor: Jean-Francois Le Costaouec, Simsbury, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/520,121

(22) Filed: Jul. 23, 2019

(65) Prior Publication Data

US 2019/0344552 A1 Nov. 14, 2019

Related U.S. Application Data

(62) Division of application No. 14/231,242, filed on Mar. 31, 2014.

(51) Int. Cl.
| | | |
|---|---|---|
| *B32B 41/00* | (2006.01) | |
| *B32B 37/24* | (2006.01) | |
| *B32B 5/12* | (2006.01) | |
| *B32B 38/18* | (2006.01) | |
| *B29B 11/16* | (2006.01) | |

(Continued)

(52) U.S. Cl.
CPC .............. *B32B 37/24* (2013.01); *B29B 11/16* (2013.01); *B32B 5/12* (2013.01); *B32B 38/1808* (2013.01); *B29C 70/32* (2013.01); *B29C 70/382* (2013.01); *B32B 2250/02* (2013.01); *B32B 2262/106* (2013.01); *B32B 2305/10* (2013.01); *B32B 2310/028* (2013.01); *B32B 2310/0445* (2013.01)

(58) Field of Classification Search
CPC ....... B32B 37/24; B32B 38/1808; B32B 5/12; B32B 2305/10; B32B 2250/02; B32B 2310/028; B32B 2262/106; B32B 2310/0445
USPC ....... 156/148, 166, 173, 175, 176, 177, 178, 156/179, 180, 441, 64
See application file for complete search history.

(56) References Cited

U.S. PATENT DOCUMENTS

| 3,523,059 A | 8/1970 | Coates |
|---|---|---|
| 4,750,964 A | 6/1988 | Hettinger, Jr. et al. |
| 7,185,404 B2 | 3/2007 | Delecroix |

(Continued)

FOREIGN PATENT DOCUMENTS

| EP | 2154278 | 2/2010 |
|---|---|---|
| EP | 2154279 | 2/2010 |

(Continued)

OTHER PUBLICATIONS

European Patent Office, European Office Action dated Oct. 30, 2018 in Application No. 15158568.4.

(Continued)

*Primary Examiner* — Michael N Orlando
*Assistant Examiner* — Joshel Rivera
(74) *Attorney, Agent, or Firm* — Snell & Wilmer L.L.P.

(57) ABSTRACT

A positive transport of carbon fiber bundles, in ribbon form, with in-line manipulation of the fiber bundles (spreading or spreading and volumization with manipulators) during fiber bundle transport to points of fiber bundle deliveries into the circular loom bed plate turntable is described herein. The automated placements of these deliveries of the fiber bundle/tow at selected orientations in the area correspond to the feeding zone of an improved circular loom bed plate turntable.

5 Claims, 9 Drawing Sheets

(51) Int. Cl.
*B29C 70/32* (2006.01)
*B29C 70/38* (2006.01)

(56) References Cited

U.S. PATENT DOCUMENTS

| | | |
|---|---|---|
| 7,596,834 B2 | 10/2009 | Shinkado |
| 8,062,448 B2 | 11/2011 | Bompard et al. |
| 2003/0107148 A1 | 6/2003 | Davis et al. |
| 2011/0154628 A1 | 6/2011 | Vincent et al. |
| 2011/0275266 A1 | 11/2011 | LeCostaouec |
| 2011/0315324 A1 | 12/2011 | Vaniglia |

FOREIGN PATENT DOCUMENTS

| | | |
|---|---|---|
| WO | 02070232 | 9/2002 |
| WO | 2014013141 | 1/2014 |

OTHER PUBLICATIONS

European Patent Office, European Office Action dated Feb. 13, 2018 in Application No. 15 158 568.4-1014.
Partial European Search Report dated Aug. 27, 2015 in European Application No. 15158568.4.
Extended European Search Report dated Jan. 21, 2016 in European Application No. 15158568.4.
European Search Report dated May 29, 2017 in European Application No. 15158568.4.
USPTO Pre-Interview First Office Action dated Sep. 9, 2015 in U.S. Appl. No. 14/231,242.
USPTO Final Office Action dated Feb. 4, 2016 in U.S. Appl. No. 14/231,242.
USPTO Advisory Action dated Apr. 22, 2016 in U.S. Appl. No. 14/231,242.
USPTO Office Action dated Jun. 3, 2016 in U.S. Appl. No. 14/231,242.
USPTO Final Office Action dated Dec. 15, 2016 in U.S. Appl. No. 14/231,242.
USPTO Advisory Action dated Feb. 23, 2017 in U.S. Appl. No. 14/231,242.
USPTO Office Action dated May 8, 2017 in U.S. Appl. No. 14/231,242.
USPTO Final Office Action dated Nov. 15, 2017 in U.S. Appl. No. 14/231,242.
USPTO Advisory Action dated Feb. 6, 2018 in U.S. Appl. No. 14/231,242.
USPTO Office Action dated Apr. 19, 2018 in U.S. Appl. No. 14/231,242.
USPTO Final Office Action dated Nov. 16, 2018 in U.S. Appl. No. 14/231,242.
USPTO Advisory Action dated Jan. 11, 2019 in U.S. Appl. No. 14/231,242.
USPTO Office Action dated Mar. 7, 2019 in U.S. Appl. No. 14/231,242.
USPTO Notice of Allowance dated Jun. 26, 2019 in U.S. Appl. No. 14/231,242.

METHOD TO TRANSPORT AND LAY DOWN DRY FIBER BUNDLES

CROSS REFERENCE TO RELATED APPLICATIONS

This application is a divisional of, and claims priority to, and the benefit of U.S. Non-Provisional application Ser. No. 14/231,242, entitled "METHOD TO TRANSPORT AND LAY DOWN DRY FIBER BUNDLES," filed on Mar. 31, 2014, which is hereby incorporated by reference in its entirety.

FIELD

This disclosure generally relates to textile preparation, and more particularly, to systems and methods associated with creating multi-axial carbon fiber tow preforms.

BACKGROUND

Carbon/carbon ("C/C") parts are employed in various industries. An exemplary use for C/C parts includes using C/C parts as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat, and thus, is able to dissipate heat away from the braking surfaces that is generated in response to braking. C/C material is also highly resistant to heat damage, and is capable of sustaining friction between brake surfaces during severe braking, without a significant reduction in the friction coefficient or mechanical failure. The fabrication of C/C parts involves attention to detail at each step of the process.

SUMMARY

According to various embodiments, a preform manufacturing apparatus having a supply of carbon fiber tow bundles, such as a spool, an electronic unwinder coupled to the supply of carbon fiber bundle and a moveable tow delivery mechanism, and a tow delivery mechanism coupled between the desired lay down location and the supply of carbon fiber bundle to orient the placement of the fiber bundle under minimal tension is described herein. The electronic unwinder, the tow delivery system and its movement in space may be configured to positively deliver the fiber bundle to a desired lay down location According to various embodiments, positive transport of the carbon fiber tows, in ribbon form, with in-line manipulation of the fiber bundles (spreading or spreading and volumization with manipulators) during their transport to points of delivery, is described herein. The automated placement of the fiber bundle in circumferential, pseudo bias, radial or any orientations on a circular loom bed plate turntable is contemplated.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, fiber bundles, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1:
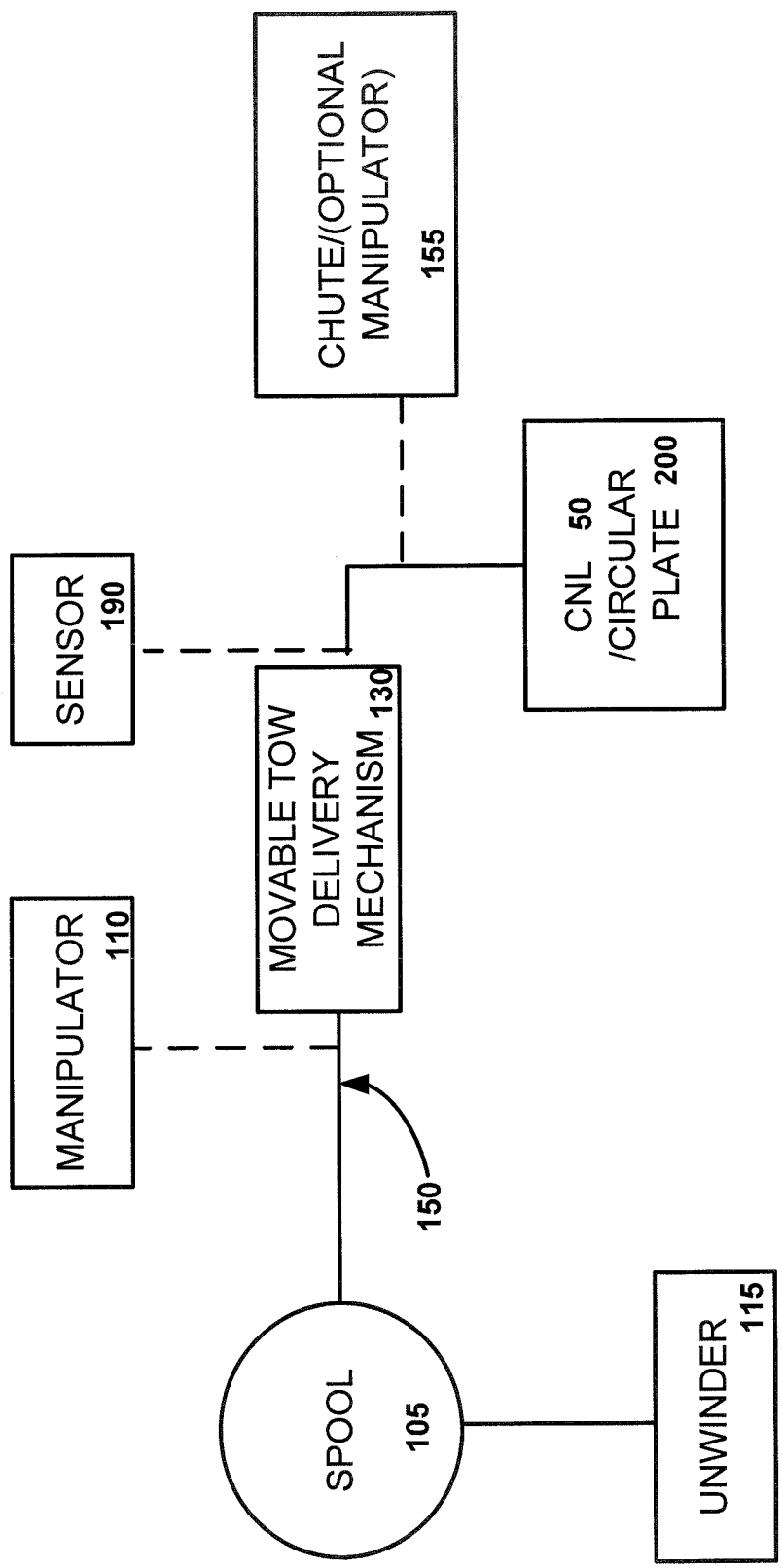
FIG. 1 illustrates a block diagram of various elements of a preform manufacturing system in accordance with various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. OPF fibers are layered in a selected orientation into a preform of a selected geometry. Two or more layers of fibers may be layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament. "Fiber bundle" may refer to a tow of substantially continuous filaments. "Fiber bundle" may also refers to various formats of narrow strips of stretch broken fibers. "Spiral" fabric may also be referred to herein as "helical" fabric. A "textile" may be referred to as a "fabric" or a "tape." A "loom" may refer to any weaving device, such as a narrow fabric needle loom.

As used herein, the term "ribbon" is used to refer to a closely packed bundle of continuous filaments and discontinuous filaments like stretch broken fibers generally delivered from a spool. A "span" as used herein may be a length of ribbon and/or tow. As used herein, the term "yarn" is used to refer to a strand of substantially continuous fibers or staple fibers or blends of these, thus the term "yarn" encompasses tow and cable. As used herein, the unit "K" represents "thousand." Thus, a 1K tow means a tow comprising about 1,000 strands of substantially continuous filaments. For example, a "heavy tow" may comprise about 48,000 (48K) textile fibers in a single tow, whereas a "medium tow" may comprise about 24,000 (24K) textile fibers within a single tow whereas a "lighter tow" may comprise about 6,000 (6K) textile fibers within a single tow. Fewer or greater amounts of textile fibers may be used per cable in various embodiments. In various embodiments disclosed herein, fabrics in accordance with various embodiments may comprise tows of from about 0.1K to about 100K, and, in various embodiments, heavier tows. As is understood, "warp" fibers are fibers that lie in the "warp" direction in the textile, i.e., along the length of the textile. "Weft" fibers are fibers that lie in the "weft" direction in the textile, i.e., along the width of the textile. Warp fibers may be described as being spaced apart with respect to the weft direction (i.e., spaced apart between the outer diameter (OD) and inner diameter (ID) of the textile). Similarly, the weft tows may be described as being spaced apart with respect to the warp direction.

In various embodiments, any combination of warp and weft tow size may be used. For example, 48 k warp tows may be used with 24 k weft tows. Also for example, other combinations of warp tows to weft tows include: 48K:12K, 24K:24K, and 24K:12K. A ribbon/carbon fiber tow may be wrapped around a round spool for ease of transport and feeding into a weaving apparatus for fabricating a fabric which is used in a subsequent preforming process using needle punching. The ribbon on the spool comprises a generally closed packed rectangular cross sectional shape. A length of ribbon may be delivered from the spool to the weaving apparatus. In response to being manipulated under tension by a weaving apparatus, the generally rectangular shaped cross section of the ribbon changes to a generally oval shaped cross section. This oval shaped cross section is undesirable and a preferred approach is to spread the ribbon in the Y direction to increase the width, W, of the ribbon to increase coverage and reduce fiber volume. The ribbon may be spread mechanically through passage over and under specially shaped bars. In the alternative, the ribbon may be spread via vacuum suction or through ultrasonic vibration. Alternatively, it may be advantageous to provide bulk to the tow through the use of an air jet, thus re-orienting a portion of the fibers and providing greater volume to the tow.

Fabrication of dry fabrics where the fiber tows retain their original flat ribbon shape (and rectangular cross-sectional shape) or are further spread beyond their as manufactured width (but maintain a rectangular cross-sectional shape) or are volumized is desirable for maximizing homogeneity of final fiber reinforced composites. The use of flat spread tows tends to minimize the amount of crimp in the manufactured fabrics and allows the fabrication of low areal weight fabric with full fiber coverage using larger tows such as about 12,000 to about 50,000 filament tows. Furthermore, in some applications, like the manufacturing of C/C friction disks where the dry fabric may be subsequently transformed into a 3D fiber structure, such as through a needle punching/needling process, looser spread tows and/or volumized tows are more conducive to the fabrication of a textile preform with a homogeneous fiber distribution within each horizontal plane of the textile.

As previously mentioned, commercial carbon fiber tows are typically packaged in the form of a flat ribbon onto spools, such as cardboard spools. However, during handling under tension through the various components of a loom, the dry tows have a tendency to "neck down" or reduce in cross sectional area and take a rounded or oval shape, when viewed along a cross section. Fiber coverage of these fabrics at low areal weights is very poor. A preform needled with such a fabric made of tighter rounded tows exhibits more distinct tows of higher fiber volume separated by larger gaps. These high fiber volume fiber bundles separated by larger gaps results in poor coverage and layers with locally higher density in finished composite product.

During fabrication of annular preforms, such as those used in aircraft brake needled preforms, it is desirable, in addition to fiber orientations, to control the shape and the fiber volume of the carbon fiber tows during the various textile steps preceding the needle-punching step. Looser/bulkier spread tows are more conducive to the fabrication of a textile brake preform exhibiting a homogeneous fiber distribution within each horizontal plane of the textile. Furthermore, the use of flat spread tows allows the fabrication of low areal weight fabrics with full fiber coverage using larger tows such as 12 to 50K tows.

Potential feed textiles to fabricate annular needled preforms such as continuous helical fabrics are typically fabricated using take-off systems to pull the fabric and tows through the weaving loom. This approach imparts tension on the ribbons and forces the bundle of tows from their original as-supplied ribbon shapes into rounded, packed tows having a generally circular and/or oblong cross-section. These fabrics with localized high fiber volume fiber bundles require high level of needling to fabricate a carbon preform with a low fiber volume, such as for the manufacturing of carbon-carbon friction disks. One efficient approach to fabricate an annular needled preform is to directly introduce part or all the fibers in the form of tows fed directly to the needle punching loom. Approaches to directly feed carbon fiber tows into a circular needle punching loom are described in U.S. Pat. No. 7,185,404 B2. The described approaches have limitations in both degree of control of the fiber orientations and the spread of tows. In this situation, limited spreading of the tows is conducted to achieve coverage along outer circumference of fiber sectors. According to various embodiments, and with reference to FIG. 1, a device may be utilized to deliver a substantially continuous feed of a length of tow/fiber bundle 150 to a needling apparatus, such as a circular needle loom 50, also known as a circular needle punching loom, and/or a lay down surface, such as a circular loom bed plate turntable 200. The device may be a device configured to impart little to no tension on the fiber bundle 150 as the fiber bundle 150 is delivered from a ribbon supply, such as a spool 105, to the circular needle loom 50 or circular loom bed plate turntable 200. According to various embodiments, the device comprises an unwinder 115, configured to maintain constant adjustable minimum tension on the tow as the tow is positively driven with tow delivery mechanism 130 placed between a delivery location and the spool 105. A sensor 190 measuring linear speed of the tow within the delivery mechanism communicates with the unwinder. The tension between the unwinder and the tow delivery mechanism is low. Stated another way, the tension between the tow delivery mechanism and the tow placement surface is extremely low as delivery mechanism 130 pushes the tow forward.

Figure 5A:
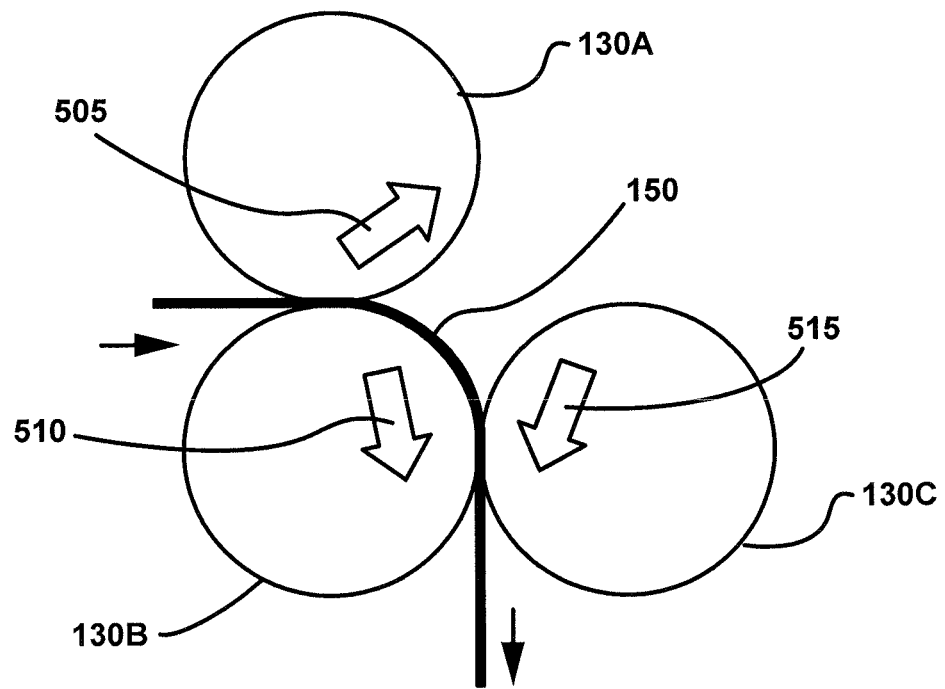
FIGS. 5A, 5B, 5C, and 5D depict various positive tow delivery configurations with low tension tow delivery mechanism/motor alignment in accordance with various embodiments.
Figure 5B:
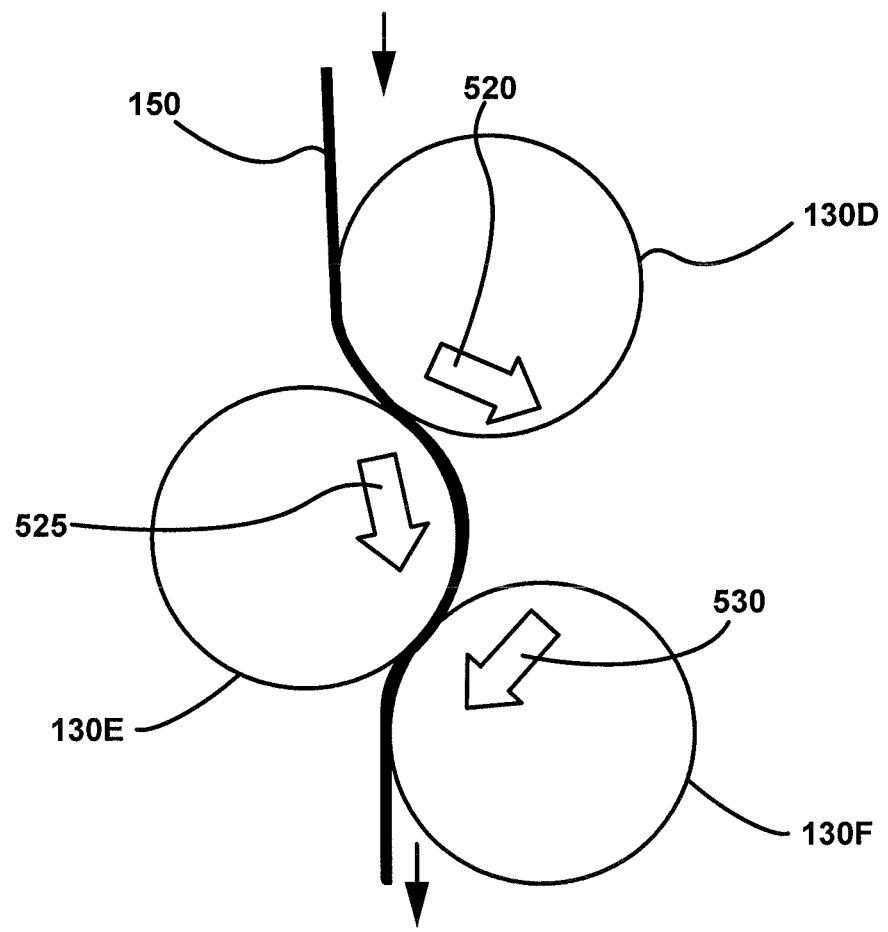
Figure 5C:
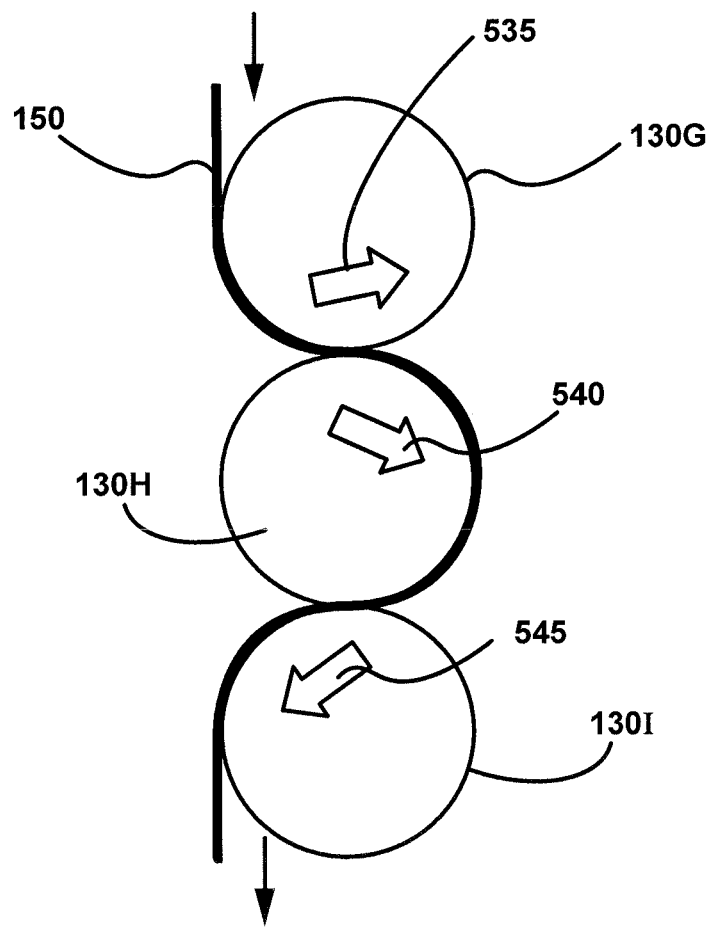
Figure 5D:
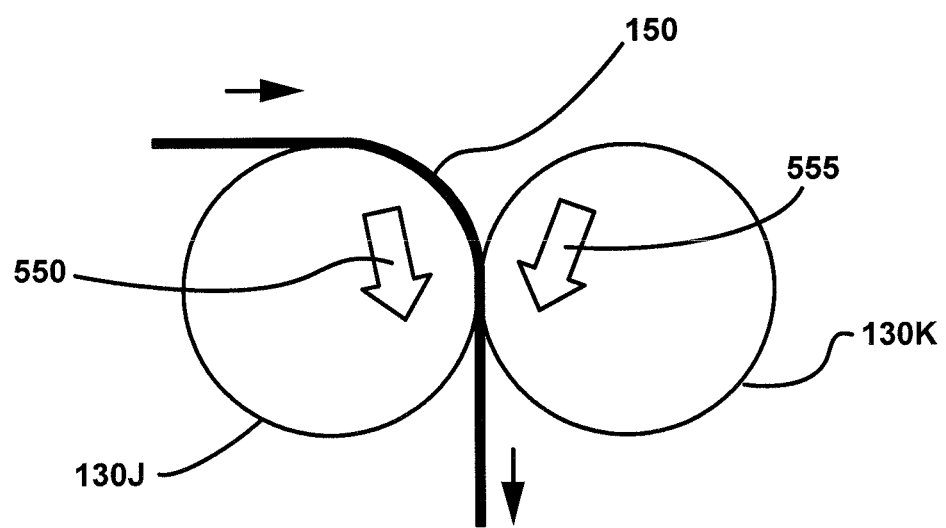

The tow delivery mechanism 130 may comprise pinch rollers with a motor driving at least one of the rollers. Several transport roller configurations are possible as shown in FIGS. 5A through 5D. In FIG. 5A for instance, the minimum force applied on the tow by tow delivery mechanisms 130A, 130B, 130C may be depicted by arrows 505, 510, 515, respectfully. Similarly, in FIG. 5B, the minimum force applied on the tow by tow delivery mechanisms 130D, 130E, 130F may be depicted by arrows 520, 525, 530, respectfully. Also, in FIG. 5C, the biasing of tow delivery mechanisms 130G, 130H, 130I may be depicted by arrows 535, 540, 545, respectfully. In FIG. 5D, the biasing of tow delivery mechanisms 130I, 130K, may be depicted by arrows 550, 555, respectfully. Each tow delivery mechanism may transport one or several tows. The spatial location of the tow delivery system above the bed plate turntable 200 may be automatically adjusted to achieve targeted fiber orientation within the preform.

According to various embodiments, and with reference back to FIG. 1, between the fiber bundle ribbon supply A that includes spool 105, and the delivery location, a manipulator 110 may be interposed. The manipulator 110 may assist with achieving the fiber volume and/or areal weight desired. The manipulator 110 may agitate, disturb, loosen, and/or spread the fiber bundle 150 into a desired fiber volume. The manipulator 110 may be a physical apparatus, such as a spreader bar. The manipulator 110 may be jets of gas, such as compressed air, configured to disturb the orientation of the fibers within the fiber bundle 150. The manipulator 110 may be an ultrasonic process to disrupt the orientation of fibers of the fiber bundle 150. A chute 155 may be interposed between the tow delivery mechanism 130 and the circular loom bed plate turntable 200. The chute 155 may take the form of a chamber where additional manipulation of the tow may be conducted. For example, compressed air may be used to manipulate the tow instead of at location of manipulator 110 or in addition to location of manipulator 110. The chute 155 may take the form of a slide or chamber which function is to guide fiber bundle 150 to final lay-up condition.

Figure 2:
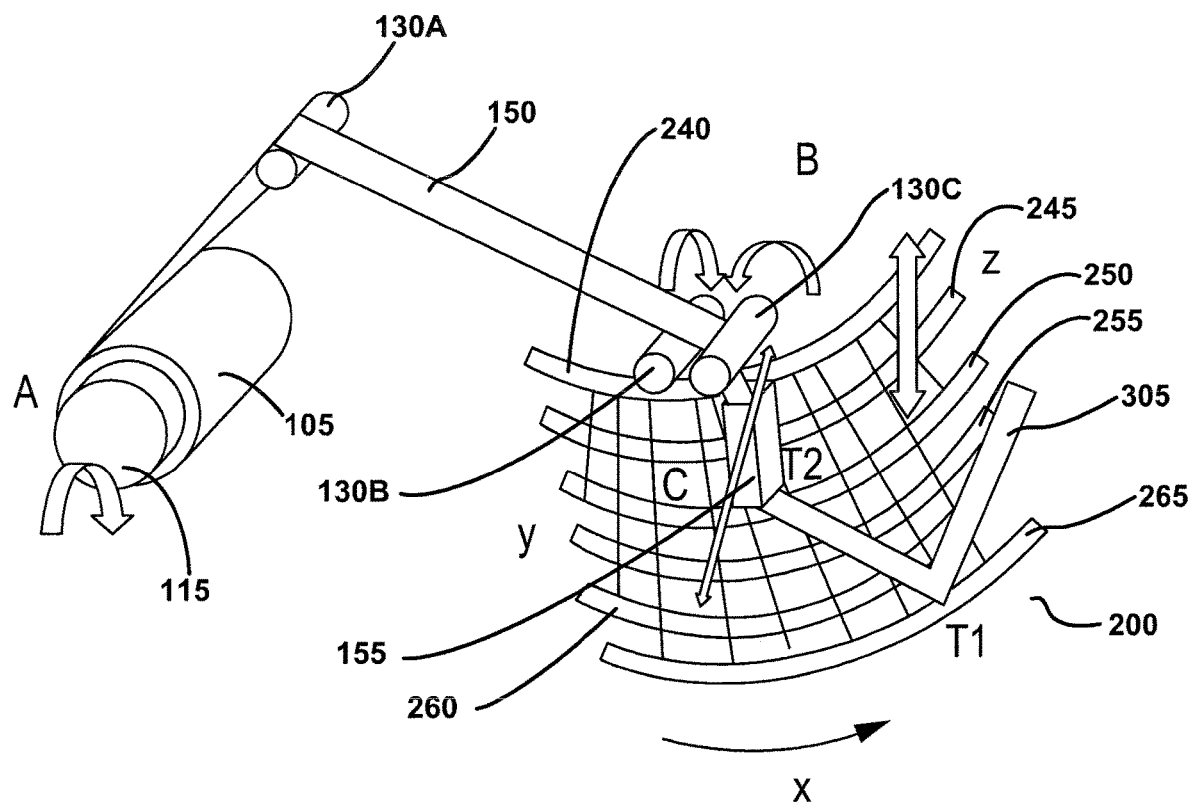
FIG. 2 illustrates an exaggerated conceptual diagram of various elements of a preform manufacturing system in accordance with various embodiments.

With reference to FIG. 2, a pre-woven unidirectional helical fabric with circumferential orientation of fiber bundles 245, 250, 255, 265 is first laid down on the bed plate of the circular needle loom 50. Moveable tow delivery assembly B+C comprising two positive tow delivery mechanisms 130B, 130C and chute 155 (C) may be positioned at a selected angle with the general rotational direction X of the turntable. The tow delivery assembly is automatically moved in the Y direction and tow section T1, T2 is deposited on the unidirectional (UD) fabric. For instance, the V shaped pattern 305 of fiber bundles is achieved by the coordination of the movement of tow delivery assembly B+C along the Y direction with the rotational movement of circular loom bed plate turntable 200 in either direction clockwise or counterclockwise.

Figure 3:
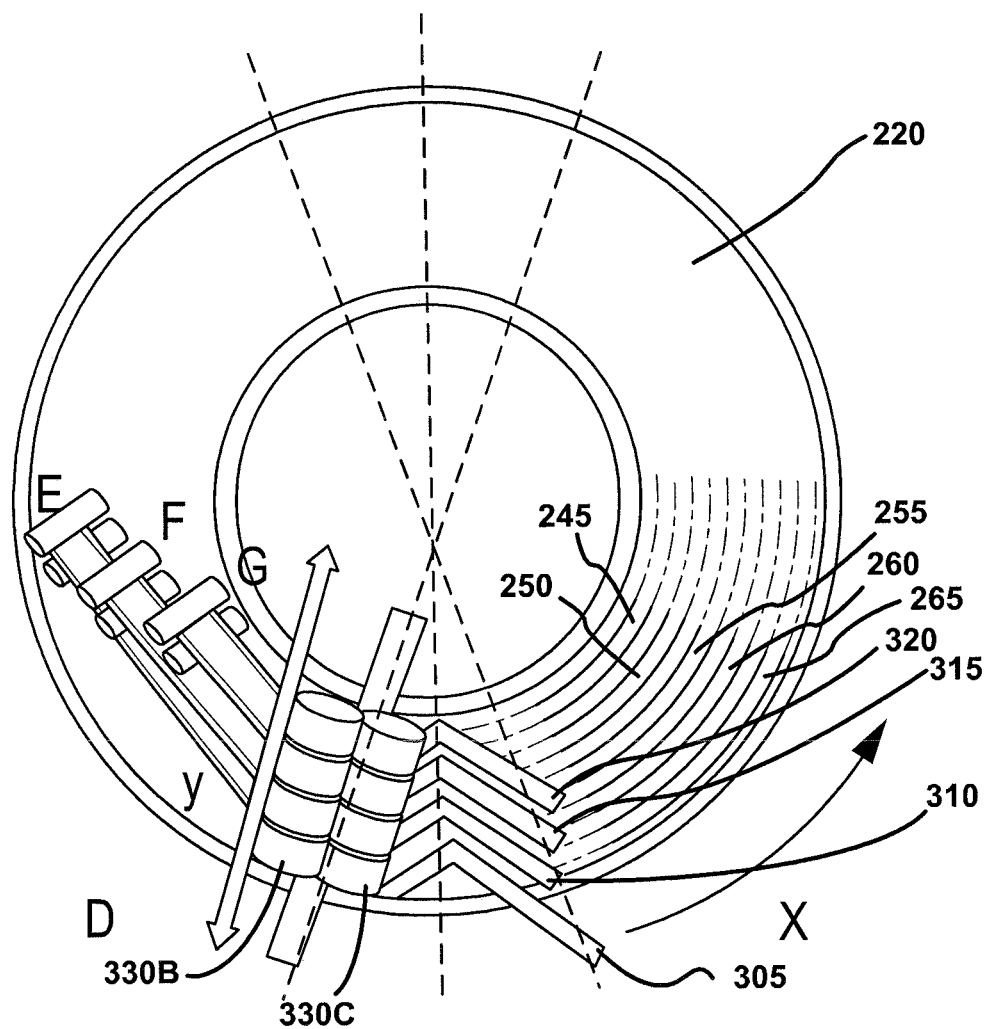
FIG. 3 illustrates a tow delivery system above a loom bed plate turntable in accordance with various embodiments.

Alternatively, with reference to FIG. 3. multiple fiber bundle layers may be simultaneously laid down on circular loom bed plate turntable 200. A plurality of stationary tow delivery systems E, F, G supporting conical pinch rollers may be used to lay down circumferential fiber bundles 240, 245, 250, 255, 260, 265 (See also FIG. 2). Each set of positive tow delivery mechanisms 130 may deliver one or several fiber bundles. Speed of tow bundle delivery is coordinated with rotational speed of turntable. Pattern 305 is achieved through entire width of bed plate at once by coordinating movement of a plate 220 of the circular loom bed plate turntable 200 with movement along Y of a plurality of tow delivery mechanisms mounted on a common support. In this way very, high fiber bundle placement speed may be achieved.

For instance, with brief reference to FIG. 3, plate 220 of the circular loom bed plate turntable 200 may work in coordinated movement with a the plurality of fiber bundle 150 feeders, such as tow delivery mechanisms 330B and 330C in close proximity. In this way, a substantially repetitive pattern, such as the V shaped pattern 305, 310, 315, 320 of laid down fiber bundles and/or the detailed fiber lay down patterns depicted in FIGS. 4A and 4B.

Figure 4A:
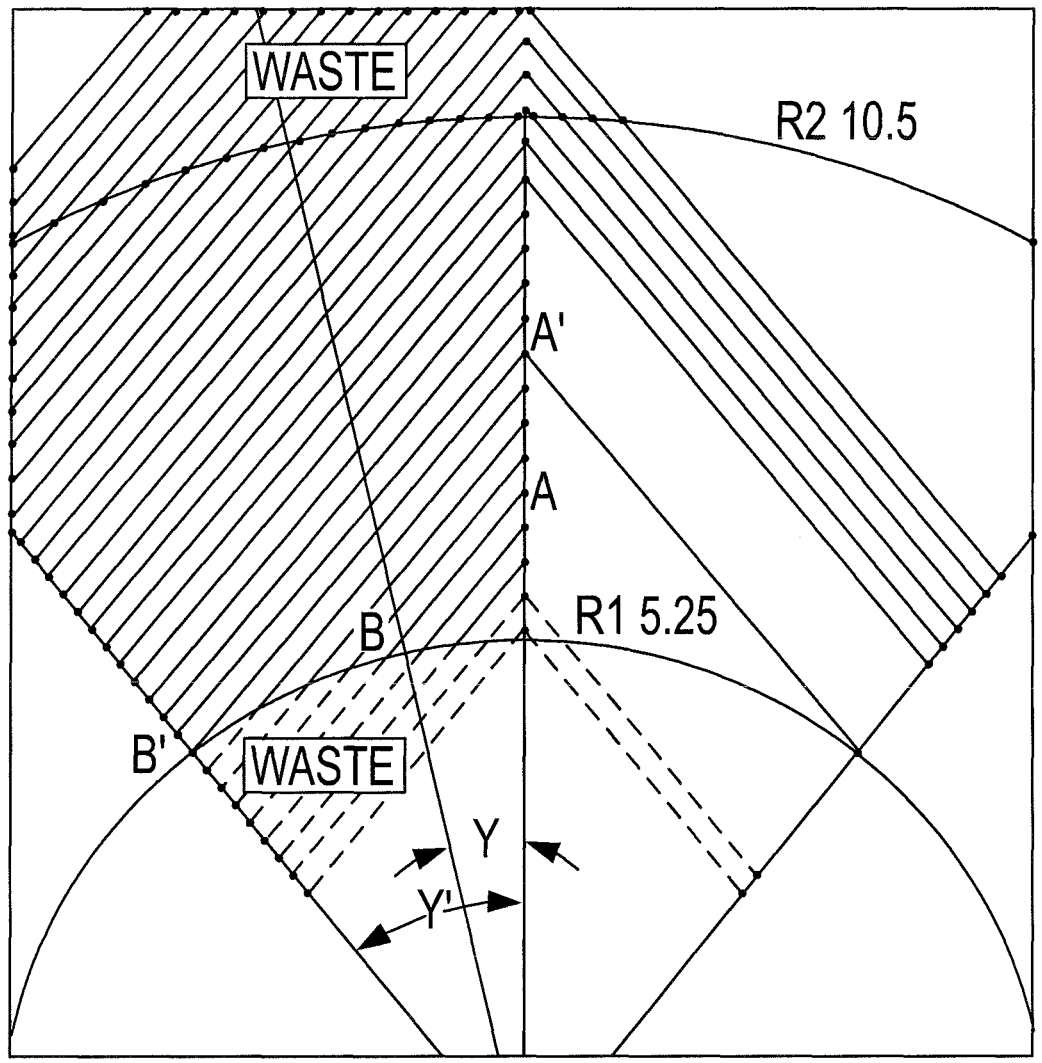
FIGS. 4A and 4B depict various pseudo bias fiber orientations in accordance with various embodiments.
Figure 4B:
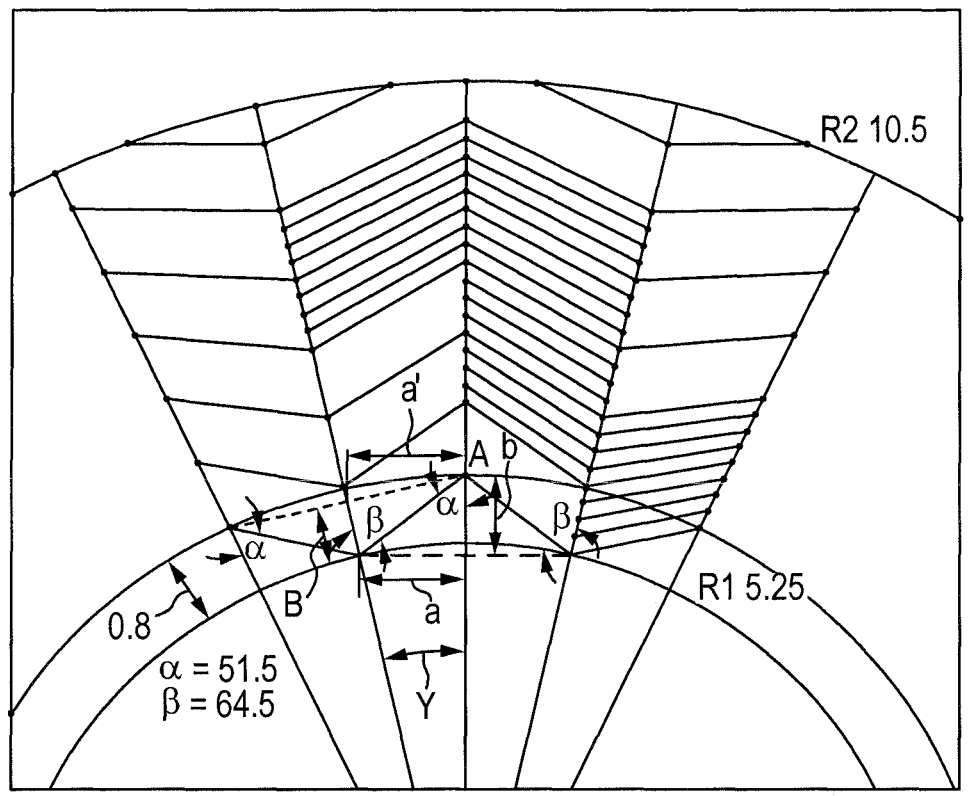

Pattern 305 is achieved at a fast pace as multiple fiber bundles are deposited at once without the need for cutting fiber bundles along the edge of the layers. Fiber bundle waste along the edge of the annular lay-up needs to be minimized through careful selection of the length of each V shaped fiber bundle section. FIG. 4A illustrates that with large gamma prime angle Y' and long A'B' V section the edge waste becomes significant. A lower gamma angle Y and shorter AB V section is preferable. FIG. 4B shows how one may define and select the orientation of each branch of the V shaped fiber bundles with respect to adjacent fictive radial lines going through the apex of the Vs. Alfa $\alpha$ defines the angle between a first radial fictive line and the first branch of the V. Beta $\beta$ is the angle between the adjacent fictive radial line and the second branch of the V. In practice alfa $\alpha$ may be varied between 45 and low 50s degrees, the resulting beta angle $\beta$ may range between about mid 50s and mid 60s degrees.

According to various embodiments, as fiber bundle 150, is received in ribbon form, with in-line manipulation of the fiber bundles 150 (spreading or spreading and volumization with manipulators 110) during their transport to points of delivery into the circular loom bed plate turntable 200 positive transport is achieved. The automated placement of these points of deliveries to lay down the fiber bundles 150 at selected orientations in the area correspond to the feeding zone of the circular loom bed plate turntable 200.

Control of the fiber bundle 150 transport is accomplished by using positive tow delivery mechanism 130. The positive tow delivery mechanism 130 may be "feed device" configured to direct the path of the fiber bundle. Positive tow delivery mechanism 130 may be any shape; however, in accordance with various embodiments the tow delivery mechanism 130 may be cylindrical and/or conical and the assembly is moveable to selected positions at selected speeds. The positive tow delivery mechanism 130 may communicate with an electronic unwinder 115 that allows the un-winding and transport of fiber bundle 150 under minimum controlled tension. Spreading, bulking of a fiber bundle 150 may be conducted using a manipulator 110, such as a by using specially curved shaped bars or/and air jets and/or ultrasonic energy and/or a combination of the above methods.

This method may be used to lay down a desired preform fiber orientation directly on the circular needle punching loom, such as on a circular loom bed plate turntable 200. This method may be practiced to lay down selected fiber orientations for all the layers of the preforms or to lay down portions of the layers onto a supporting pre-woven helical fabric simultaneously fed to the circular needle-punching loom. According to various embodiments, with reference to FIGS. 2 and 3, arrangement of a plurality of transport/feeding sub-systems on a common mechanized axis Y enables, in particular, the rapid application of multiple fiber bundles 150 at once. Using an unwinder 115 with controlled low tension allows using miniature servomotors to positively drive the fiber bundle 150 and fit the feeding subsystem into a small envelop, which is an important feature when fiber bundles 150 are being fed directly to the circular needle loom 50. In this way, unwinder 115 with servomotors may positively drive the fiber bundle 150 with extra slack such that little to no tension is applied to the fiber bundle 150 such that it may retain its as delivered rectangular cross-sectional ribbon shape or modified imparted shape through suitable manipulation.

According to various embodiments, a transport mechanism may comprise a positively fed fiber bundle 150 using a unwinder 115 unit with automated tension control and carbon fiber spool 105, positive tow delivery mechanism 130 driven by servomotors to assist with positively feeding fiber bundle 150, a fiber bundle feeding chute 155, coordinated X and Y movements to lay down fiber bundles 150 at selected angles satisfying unique circular geometry of a targeted annular shaped textile. The fiber bundle 150 may be fed to the feeding chute 155 under controlled minimum tension, using the servomotors and positive tow delivery mechanism 130 as positive fiber bundle 150 drives. The tension of the fiber bundle 150 between the spool 105 and the positive tow delivery mechanism 130 may be controlled by an electronic unwinder 115 and speed sensor. This mode of transport delivers a flat fiber bundle 150 to the feeding chute 155. A fiber bundle 150 may be laid-down according to the selected fiber lay down pattern (with brief reference to FIGS. 4A and 4B) by coordinating the movements of the circular loom bed plate turntable 200 and the Y movement of the chute 155 fiber bundle 150 delivery assembly. Circumferential fiber orientation may be achieved (with brief reference to FIG. 3). Other orientations such as pure radial orientation may also be achieved. Alternatively air jets may be installed in between the spool and tow delivery system or in the feeding chute 155 to bulk the fiber bundle 150 and reduce its fiber volume. Fiber bundle 150 may be delivered/applied with a small amount of tension or with some slack by controlling the circumferential speed of the tow delivery mechanism 130 and the speed of the X, Y movements of the circular loom bed plate turntable 200.

According to various embodiments, a process to manufacture, at high speed, a net shape preform, such as an annulus, with circumferential fibers and fibers oriented at selected angles from the annular preform radial directions is to first fabricate a continuous helical shape fabric using carbon fiber bundles 150 in the circumferential direction and a synthetic yarn in the fill direction. This continuous fabric is then fed to the bed plate of a circular loom bed plate turntable 200. A fiber bundle feeder's assembly is used to continuously and simultaneously lay down multiple fiber bundles in the form of a V pattern on top of the unidirectional fabric. This approach allows taking advantage of various methodologies put forward in U.S. patent application, entitled "System and Method for Textile Positioning" US2011/0275266A1 and filed on May 5, 2010 incorporated herein by reference, where transport of the fabric and of the preform being built is realized on a smooth bed plate by the inner and outer edges of the fabric, such as the unidirectional helical carbon fabric. A spool of unidirectional helical carbon fabric wound on a conical mandrel as shown in the above reference application (e.g., US2011/0275266A1) is unwound on the bed plate of a circular needle loom 50. An assembly of several motorized feeders is used to lay down the fiber bundles 150 across the width of the fabric in a single movement. The geometrical definition of the adjacent Vs (segment length and angles with radial directions) may be achieved by coordinating the rotational movement of the circular loom bed plate turntable 200 and of the radial movement Y of the feeder's assembly. A moveable horizontal bar oriented in the radial direction or sets of wheels may be used to keep the V segments flat and in position.

According to various embodiments, subsystems to achieve the desired lay down pattern may include a plurality of cylindrical nip or conical pinch rollers applying pressure on the fiber bundle 150 to drive it. Each tow delivery mechanism 130 (may be cylindrical or conical) may be driven by its own miniature servomotor. Alternatively, only one of each set of rollers is motorized and the drive of the fiber bundle 150 is accomplished by using a second spring loaded conical roller or a system where the roller is mechanically pushed into position. A suitable orientation for the rollers is mounting the rollers horizontally above the feeding chute 155 as shown in FIG. 2.

According to various embodiments, subsystems to achieve the desired lay down pattern may include various rollers depicted in FIGS. 5A, 5B, 5C, and 5D. For instance, increased surface contact between the fiber bundle 150 on the surface of the rollers may be achieved using additional rollers. At a minimum, one of the rollers is driven by motor. Other rollers may be motorized or passive. Each driven roller may assist with advancing a plurality of fiber bundles 150, for example, simultaneously. The face of the delivery location, such as the circular loom bed plate turntable 200, may be divided into sections to which multiple lengths of fiber bundles 150 are delivered simultaneously. This may decrease the time it takes to form a layer of preform. Each section may have a dedicated driven roller. The speed of the fiber bundle 150 delivery, based on the location of the driven roller with respect to the preform ID and OD, may vary. A sensor 190 (with brief reference to FIG. 1) coupled to the roller and/or the circular loom bed plate turntable 200 may direct the speed of the unwinder. For instance, the circumferential speed of the electronic unwinder 115 may be varied based on readings of the sensor 190 coupled to at least one of the tow delivery mechanism and the desired lay down location of the fiber bundle 150. A controller may also direct and/or vary the speed of the unwinder based on the lay down pattern of the fiber bundles 150. The controller may comprise a processor and may be coupled to a non-transitory, tangible storage medium.

Alternatively, a smaller number of rollers with a conical geometry may be implemented to control the combined delivery of several tows. In this situation, the ratio small diameter d/large diameter D of the roller is proportional to the ID/OD of the annular section to be covered. Each respective electronic unwinder speed may be set accordingly. Thus, controlled delivery of dry tows to a compact fiber placement may be achieved.

As noted above, existing reels, spools and other mechanisms may be used for storing and deploying spiral wound textiles, fiber bundles and/or carbon fiber tows. Although this disclosure illustrates and describes various embodiments, equivalents and modifications will occur to others who are skilled in the art upon reading and understanding of the disclosure.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   positively transporting by pushing a fiber bundle forward and placing a length of fiber tow to a desired orientation via a moveable positive tow delivery mechanism interposed between a fiber bundle supply and a desired lay down location of the fiber bundle delivery; and
   controlling delivery of a fiber bundle tension from the fiber bundle supply through an electronic unwinder.

2. The method of claim 1, further comprising varying a circumferential speed of the electronic unwinder based on readings of a sensor coupled to at least one of the moveable positive tow delivery mechanism and the desired lay down location of the fiber bundle.

3. The method of claim 1, further comprising manipulating at least one of a fiber volume and an a real weight of the fiber bundle via a manipulator of a plurality of manipulators coupled between the desired lay down location of the fiber bundle and the fiber bundle supply.

4. The method of claim 1, wherein the desired lay down location comprises a circular loom bed plate turntable, wherein the circular loom bed plate turntable comprises a rotatable face configured to impart an axis of control for a placement of the fiber bundle.

5. The method of claim 1, wherein the movable positive tow delivery mechanism further comprises pinch rollers with a motor driving at least one of the pinch rollers.

* * * * *